United States Patent [19]
Blake

[11] Patent Number: 4,583,624
[45] Date of Patent: Apr. 22, 1986

[54] FLUID SYSTEM WITH SELECTIVE DIFFERENTIAL PRESSURE CONTROL

[75] Inventor: William W. Blake, Kewanee, Ill.

[73] Assignee: Caterpillar Tractor Co., Peoria, Ill.

[21] Appl. No.: 679,723

[22] Filed: Dec. 10, 1984

[51] Int. Cl.$^4$ .................... F16D 25/11; F15B 13/06
[52] U.S. Cl. ...................... 192/3.22; 91/29; 91/31; 91/518; 192/3.25; 192/3.33; 192/87.13; 192/109 F
[58] Field of Search ............ 192/3.22, 3.25, 3.26, 192/3.27, 3.33, 3.57, 87.13, 87.18, 87.19, 109 F; 91/29, 31, 518

[56] References Cited

U.S. PATENT DOCUMENTS

| | | | |
|---|---|---|---|
| 3,025,717 | 3/1962 | Christenson | 74/645 |
| 3,389,770 | 6/1968 | Golan et al. | 192/87.13 |
| 3,468,194 | 9/1969 | Horsch et al. | 192/87.13 X |
| 3,566,716 | 3/1971 | Chatterjea | 192/109 F X |
| 3,739,807 | 6/1973 | Landrus et al. | 137/469 |
| 3,998,111 | 12/1976 | Blake | 74/752 C |
| 4,046,160 | 9/1977 | Horsch | 192/109 F X |
| 4,132,302 | 1/1979 | Chatterjea | 192/87.13 |
| 4,138,004 | 2/1979 | Horsch | 192/3.57 |
| 4,294,278 | 10/1981 | Blake | 137/115 |

Primary Examiner—Rodney H. Bonck
Attorney, Agent, or Firm—J. W. Burrows

[57] ABSTRACT

Fluid systems having modulating pressure relief valves are normally needed in systems having clutches that require smooth engagement. It is also desired in many systems to maintain a difference in pressure levels between the fluid in different clutches, such as, speed and directional clutches during initial engagement in order to ensure that only one of the clutches absorbs the initial load. In order to reduce power losses and improve system efficiency, it is desirable to reduce the pressure level of the higher clutch once the clutches are fully engaged. The present modulating pressure relief valve assembly provides a valve device that is effective to limit the maximum pressure in the system and change the pressure difference between the clutches upon full engagement thereof. The valve device is located in a single bore thus reducing total valve size and manufacturing costs.

29 Claims, 6 Drawing Figures

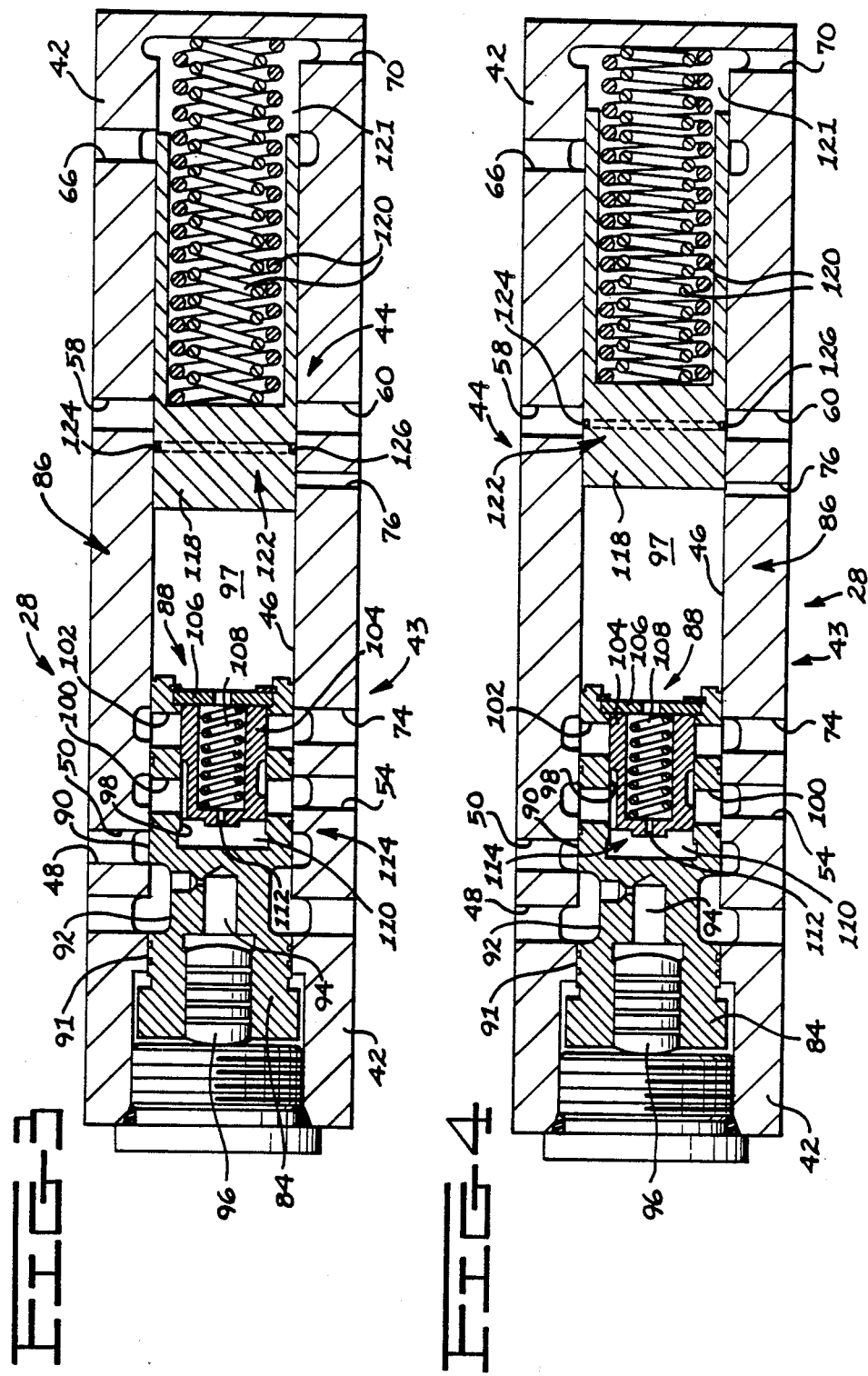

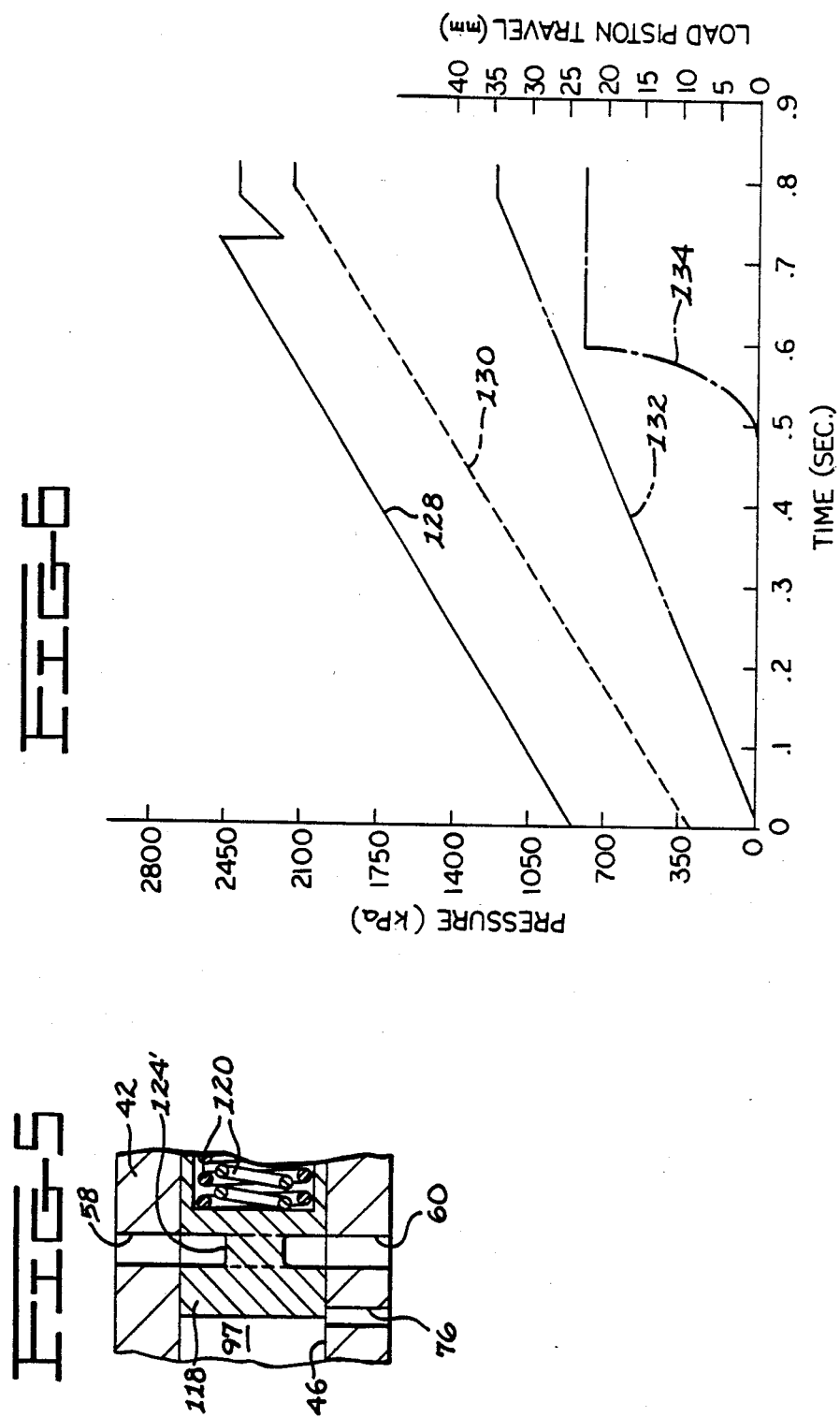

FLUID SYSTEM WITH SELECTIVE DIFFERENTIAL PRESSURE CONTROL

DESCRIPTION

1. Technical Field

This invention relates generally to a fluid system having a modulating pressure relief valve for controlling the rate of pressure rise in a fluid system and more particularly to a fluid system that also controls the differential pressure in the system.

2. Background Art

Modulating pressure relief valves are provided in fluid systems to control the rate of pressure rise in an actuator or other fluid operated device. It is desirable in many systems to have two different fluid operated devices, such as clutches, operating at two different levels. To achieve this operating function, it has been a practice to use a separate differential valve independent of the relief valve. This type of arrangement requires larger valve bodies to provide the space for an extra bore to accommodate the differential spool. Naturally this adds additional cost to the total system. Even though it is necessary in many systems to have two different pressure levels during initial engagement of the fluid operated devices, the added pressure of the higher one is not normally needed to maintain engagement. The maintaining of the unnecessary higher pressure level detracts from the overall efficiency of the fluid system, especially from the standpoint of power loss and extra induced heat generated by the higher pressure level fluid being directed across the relief valve.

The present invention is directed to overcoming one or more of the problems as set forth above.

DISCLOSURE OF THE INVENTION

In one aspect of the present invention, a fluid system is provided for use in a vehicle. The system includes a source of pressurized fluid, a distribution conduit connected to the source and a means is provided in the distribution conduit for restricting the flow of fluid and establishing a difference in pressure of the fluid in the distribution conduit upstream and downstream of the flow restricting means. A first force transmitting mechanism is connected to the distribution conduit upstream of the flow restricting means and a second force transmitting mechanism is connected to the distribution conduit downstream thereof. A valve means is provided for reducing the difference in the pressure of the fluid upstream and downstream of the flow restricting means in response to the pressure of the fluid in the distribution conduit reaching a predetermined pressure level.

The present invention provides a fluid system that not only controls the rate of pressure rise for two different fluid operated devices but also reduces the difference in the pressure of the fluid in the two fluid operated devices once the devices have been operated. The reduction in the pressure level increases the system efficiency by reducing horsepower loss and further controlling heat generation.

BRIEF DESCRIPTION OF THE DRAWINGS

FIGS. 3 and 4 are diagrammatic representations of the modulating pressure relief valve of FIG. 2 shown in various stages of the one mode of operation;

FIG. 5 is a diagrammatic representation of an alternate embodiment of a portion of the modulating pressure relief of FIG. 1; and FIG. 6 is a graph illustrating the relationship between the operating pressures of the fluid devices in FIG. 1 verses time, plus the relationship of the pressure to a torque converter relative to the load piston travel.

BEST MODE FOR CARRYING OUT THE INVENTION

Figure 1:
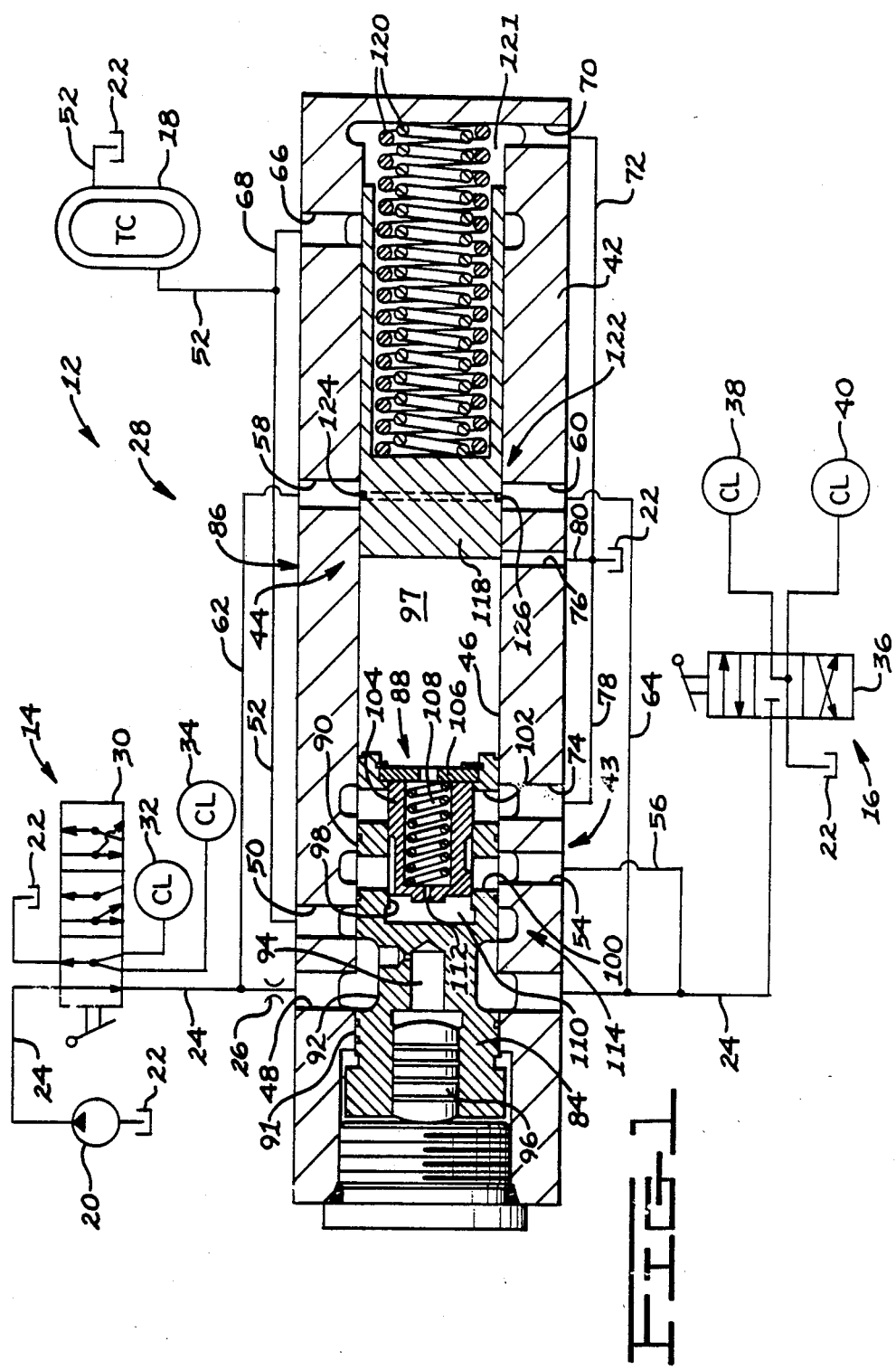
FIG. 1 is a partial schematic and diagrammatic representation of a fluid system incorporating an embodiment of the present invention.

Referring now to the drawings, a fluid system 12 is shown for use in a vehicle (not shown) having first and second drive engaging mechanisms 14,16 and a torque converter 18. As more specifically shown in FIGS. 1 and 2, the fluid system includes a source of pressurized fluid, such as a pump 20, a reservoir 22, a distribution conduit 24 connected to the pump 20, a means for restricting the flow in the distribution conduit 24, such as an orifice 26, the first and second drive engaging mechanisms 14,16, the torque converter 18, and a modulating pressure relief valve assembly 28.

The first drive engaging mechanism 14 is connected to the distribution conduit 24 upstream of the orifice 26 and includes a speed selector valve 30 movable between first, second and third positions and first and second speed clutches 32,34. The second drive engaging mechanism 16 is connected to the distribution conduit 24 downstream of the orifice 26 and includes a directional selector valve 36 movable between neutral, forward and reverse positions, a forward clutch 38 and a reverse clutch 40.

The modulating pressure relief valve assembly 28 is also connected to the distribution conduit 24 downstream of the orifice 26 and the torque converter 18 is connected to the modulating pressure relief valve assembly 28 in a manner as defined later.

The modulating pressure relief valve assembly 28 includes a housing 42, a modulating relief valve 43 and a valve means 44. A single bore 46 is defined in the housing 42. A first inlet port 48 intersects the single bore 46 and serves as a through passageway for the distribution conduit 24. An outlet port 50 intersects the single bore 46 adjacent the inlet port 48 and is connected to a low pressure zone, such as, the torque converter 18, by a conduit 52.

A second inlet port 54 intersects the single bore 46 adjacent the outlet port 50 and is connected to the distribution conduit 24 downstream of the orifice 26 by a conduit 56. The second inlet port 54 is located on the opposite side of the outlet port 50 as compared to the first inlet port 48.

The valve means 44 is provided for reducing the difference in the pressure of the fluid upstream and downstream of the orifice 26 in response to the pressure of the fluid in the distribution conduit 24 reaching a predetermined pressure level and includes first and second shunt ports 58,60 which intersect the single bore 46 in the same cross-sectional plane and axially spaced from the second inlet port 54. A conduit 62 connects the first shunt port 58 with the distribution conduit 24 upstream of the orifice 26 and a conduit 64 connects the second shunt port 60 with the distribution conduit 24 downstream of the orifice 26.

A vent port 66 intersects the single bore 46 axially spaced further from the second inlet port 54 than the first and second shunt ports 58,60. A conduit 68 connects the vent port 66 with the conduit 52.

A first drain port 70 intersects the single bore 46 axially spaced from the vent port 66 and is connected to the reservoir 22 by conduit 72. Second and third drain ports 74,76, axially spaced from one another, intersect the single bore 46 between the second inlet port 54 and the first and second shunt port 58,60. Conduits 78,80 respectively connect the second and third drain ports 74,76 with the reservoir 22.

The modulating pressure relief valve 43 includes a valve spool 84 slidably disposed in the single bore 46, a means 86 for providing a variable biasing force to the valve spool 84, and a means 88 for controllably interconnecting the pump 20 to the biasing force means 86.

The valve spool 84 is movable between first and second positions and has lands 90 and 91 separated by an annulus 92 that remains in continuous communication with the first inlet port 48. A passageway 94 communicates the annulus 92 with a reaction piston 96 slidably disposed in one end of the valve spool 84 to effectively bias the valve spool 84 toward the second position in response to the pressure of the fluid in the inlet port 48. A first pressure chamber 97 is defined in the single bore 46 at the other end of valve spool 84.

The valve spool 84 further includes a blind bore 98 defined in the other end of the valve spool 84 with passages 100,102 opening into the blind bore 98. The passage 100 is in continuous communication with the second inlet port 54 and the passage 102 is in continuous communication with the second drain port 74.

A valving element 104 is slidably disposed in the blind bore 98 and movable between first and second positions. A flat washer 106 is secured to the valve spool 84 at the open end of the blind bore 98 to maintain the valving element 104 in the blind bore 98. A spring 108 is located in the blind bore 98 between the valving element 104 and the flat washer 106. A second pressure chamber 110 is defined in the blind bore 98 on the side of the valving element 104 opposite the spring 108 and is in continuous communication with the second inlet port 54 through the passage 100. An orifice 112 is defined in the valving element 104 and is adapted to controllably connect the second inlet port 54 with the first pressure chamber 97 defined in the single bore 46 by way of the passage 100, the second pressure chamber 110, and the orifice 112.

The blind bore 98, the valving element 104, the flat washer 106, the second spring 108, the second pressure chamber 110, the passage 100, and the orifice 112 constitutes a means 114 for orificing the flow of fluid between the second inlet port 54 and the first pressure chamber 97. Furthermore the second inlet port 54, the conduit 56, and the orificing means 114 constitutes the means 88 for controllably interconnecting the inlet port 48 and the pressure chamber 97.

The variable biasing means 86 is provided to bias the valve spool 84 towards the first position. The variable biasing means 86 includes the pressure chamber 97, a valve mechanism, such as a load piston 118, a spring assembly 120, a spring chamber 121 and means 122 for selectively interconnecting the first and second shunt ports 58,60.

The load piston 118 is slidably disposed in the single bore 46 and is movable between a first position, an intermediate position and a second position. The spring assembly 120 is located in the spring chamber 121 defined in the single bore 46 on the opposite side of the load piston 118 with respect to the valve spool 84. The pressure chamber 97 is defined in the single bore 46 between the load piston 118 and the valve spool 84.

The interconnecting means 122 includes an annulus 124 defined on the load piston 118. The annulus 124 establishes a second orifice 126 that is additive to the first orifice 26 and has an additive size greater than the size of the first orifice 26.

FIG. 5 is a fragmentary portion of a modification of the annulus 124 of FIGS. 1–4. The annulus 124' of FIG. 5 also functions to interconnect the first and second shunt ports 58,60 but does not provide any resistance to fluid flow thereacross.

FIG. 6 is a graphic representation of the pressure of the fluid in the first and second drive engaging mechanisms 14,16 and the pressure of fluid to the torque converter 18 each being with respect to time. For example, a solid line 128 represents the pressure of the fluid in the first drive engaging mechanism 14 and a dashed line 130 represents the pressure of the fluid in the second drive engaging mechanism 16. A phantom line 132 represents the travel of the load piston 118 relative to time, and a line 134, illustrated by long dashed lines separated by dots, represents the pressure to the torque converter 18 as a function of load piston travel.

It is recognized that various forms of the modulating pressure relief valve assembly 10 could be used without departing from the essence of the invention. For example, the first and second shunt ports 58,60 could be located side by side and the annulus 124 on the load piston 118 could be an axial slot. Also, the distribution conduit 24 would not have to pass through the housing 42. A separate conduit could connect the inlet port 48 with the distribution conduit 24. The orifice 26 could be any form of flow restricting mechanism, such as; a valve, a variable orifice, or a flow restricting conduit. The means 88 for controllably interconnecting the first inlet port 48 and the pressure chamber 97 could be a single orifice in the valve spool 84, a passageway in the housing 42, or a separate orificed conduit.

INDUSTRIAL APPLICABILITY

During the neutral condition of the fluid system 12 as shown in FIG. 1, pressurized fluid from the pump 20 is directed via the distributing conduit 24 through the speed selector valve 30, across the orifice 26, through the housing 42 of the modulating pressure relief valve 43 and to the directional selector valve 36. With the system 12 in the neutral condition, the modulating pressure relief valve 43 maintains the fluid at the inlet port 48 at the maximum pressure level. The excess fluid flow is controllably bypassed to the outlet port 50 and subsequently to the torque converter 18. The pressure of the fluid at the inlet port 48 is applied to the reaction piston 96 through passageway 94 to effectively urge the valve spool 84 towards the second position at which communication between the inlet port 48 and the outlet port 50 is open. Pressurized fluid from the distribution conduit 24 downstream of the orifice 26 is directed to the first pressure chamber 97 through the conduit 56, the second inlet port 54, and the orifice 112. The pressure of the fluid in the first pressure chamber 97 acting on the end of the valve spool 84 urges the valve spool 84 towards the first position at which the inlet port 48 is blocked from the outlet port 50. As the pressure of the fluid in the first pressure chamber 97 increases, the load piston 118 moves rightwardly against the increasing bias of the spring assembly 120. The load piston 118 reaches its maximum travel when the third drain port 76 initiates communication with the first pressure chamber 97. At the same time, the maximum pressure level of the fluid at the inlet port 48 is established and the valve spool 84 maintains an intermediate position as shown.

Figure 2:
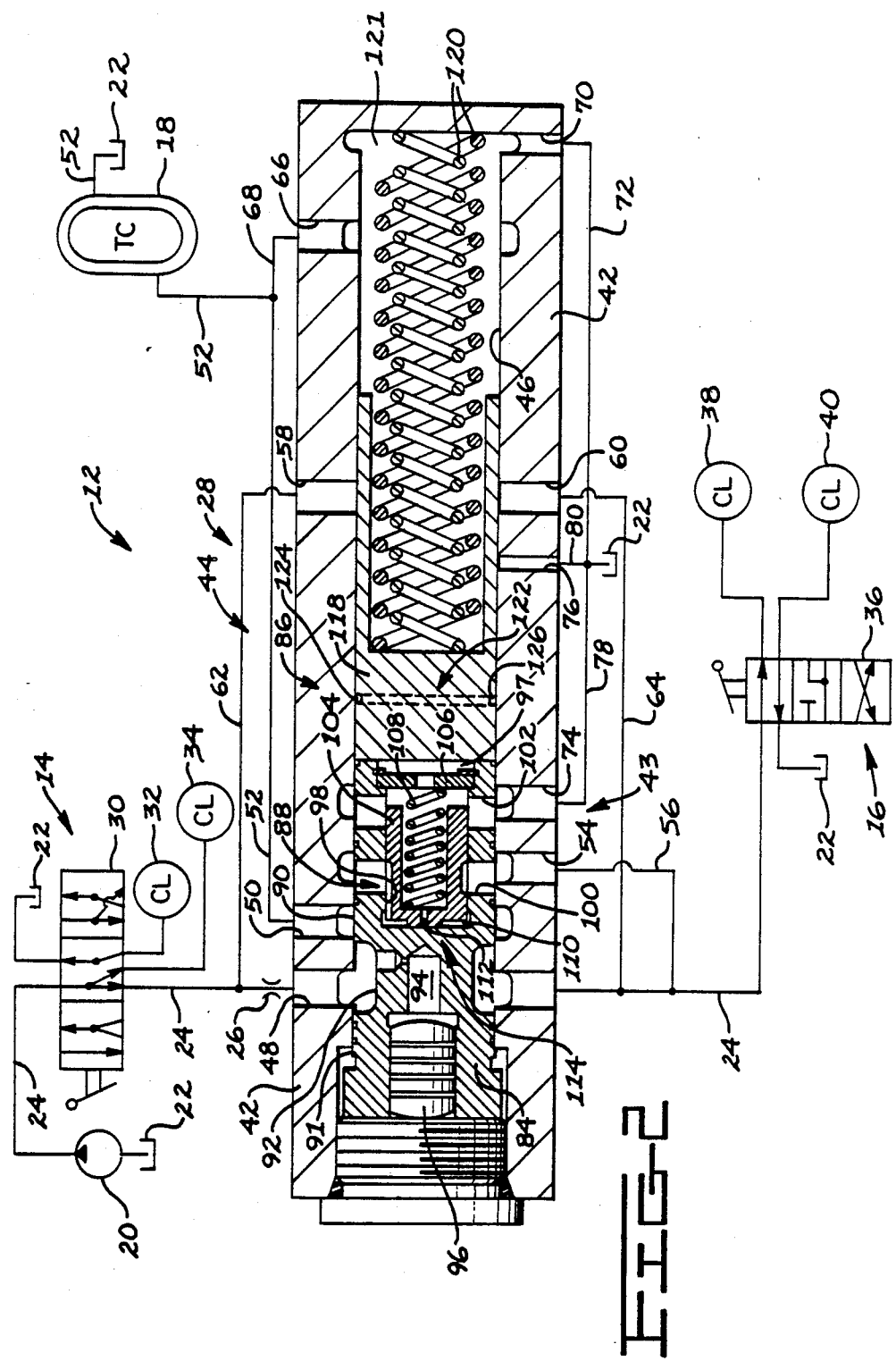
FIG. 2 is a partial schematic and diagrammatic representation of the fluid system of FIG. 1 in one mode of operation.

FIG. 2 illustrates the operation of the fluid system 12 upon placing the directional selector valve 36 and the speed selector valve 30 in one of the operational modes. Due to the filling of the speed clutch 34 and the forward clutch 38, in the operational mode shown, the pressure level of the fluid in the distribution conduit 24 drops to a very low level, for example 70 kPa (10 psi).

Due to the drop in the pressure of the fluid in the distribution conduit 24, several things happen. The pressure of the fluid in passageway 94 drops, thus allowing the valve spool 84 to move to the first position, blocking communication between the inlet and outlet ports 48,50. At substantially the same time, the pressure of the fluid in the second pressure chamber 110 drops thus allowing the valving element 104 to quickly move from the first position at which communication between the first pressure chamber 97 and the second drain port 74 is blocked to the second position at which the communication is open. Consequently, due to the absence of fluid pressure in the pressure chamber 97, the load piston 118 quickly moves in the leftward direction by the force of the spring assembly 120. When the load piston 118 moves leftwardly far enough to open the vent port 66, the pressure of the fluid to the torque converter 18 is vented to the reservoir. By venting the pressurized fluid to the torque converter 18, it is assured that no pressure exists in the clutches or the first pressure chamber 97 as a result of back pressure during filling of the clutches 34,38. This helps to eliminate any jerky or harsh engagement of the clutches.

Once the clutches are filled, the pressure of the fluid in the distribution conduit 24 begins to increase. Referring to FIG. 3 in conjunction with FIG. 2, the increasing pressure in the distribution conduit 24 is directed to the first pressure chamber 97 through the second inlet port 54 and across the second orifice 112. The force of the increasing pressure moves the load piston 118 rightwardly against the bias of the spring assembly 120. Simultaneously, excess flow is bypassed from the inlet port 48 towards the torque converter 18. During a portion of the rightward movement of the load piston 118, the conduit 52 leading to the torque converter 18 is vented to the reservoir 22. During further rightward movement, the load piston 118 blocks the vent port 66 resulting in an increase of the pressure level of the fluid in conduit 52 which is connected to the torque converter 18.

The pressure level of the fluid in the speed clutch 34 during initial engagement is higher than the pressure level of the fluid in the forward clutch 38. This is attributed to the pressure drop across the orifice 26 and having the speed clutch 34 connected to the source upstream of the orifice 26 and the forward clutch connected downstream of the orifice 26.

As the pressure level of the fluid in the distribution conduit 24 continues to increase, the load piston 118 continues to move rightwardly against the bias of the spring assembly 120. Referring to FIG. 4, the load piston 118 reaches a position at which the annulus 124 provides a communication path between the first and second shunt ports 58,60. The orifice 126 defined by the annulus 124 provides a restricted flow path between the first and second shunt ports 58,60 thus changing, and in this embodiment reducing, the difference in pressure between the speed clutch 34 and the forward clutch 38. By reducing the pressure difference between the clutches after full engagement thereof, power losses are reduced along with a reduction in excess heat that would normally be generated by the flow at a higher pressure being passed across the relief valve spool 84. The amount of pressure reduction in the speed clutch 34 is dependent on the amount of force needed to maintain the speed clutch 34 engaged. It is possible in many applications to reduce the pressure in the speed clutch to the same pressure level that is in the directional clutch.

Once the load piston 118 moves far enough rightwardly to uncover the third drain port 76, the pressure level of the fluid in the first pressure chamber 97 balances with the force of the spring assembly 120 thus halting further movement of the load piston 118. The annulus 124 still remains in communication with the first and second shunt ports 58,60 during this additional movement of the load piston 118.

The above description holds true regardless of which speed clutch 32/34 is being used or which directional clutch 38/40 is being used.

The graph on FIG. 6 illustrates one example of the fluid system 12 described above. More specifically, the difference in pressure between the speed and directional clutches 32/34,38/40 and the rate of pressure rise are illustrated by the lines 128,130 on the graph. The line 132 represents the total travel of the load piston 118. Also note that once the clutches are fully engaged, the difference in pressure between the clutches is reduced. The amount of change or reduction is controlled by the size of the annulus 124 which defines the orifice 126. The larger the orifice 126, in addition to the orifice 26 in the distribution conduit 24, the larger the reduction in the pressure difference.

The line 134, shown in FIG. 6, illustrates that during the initial pressure rise in the clutches the pressure of the fluid to the torque converter 18 remains vented. Once the load piston 118 reaches the intermediate position and closes the vent port 66, the pressure of the fluid to the torque converter 18 increases to its normal level.

In the alternate embodiment of FIG. 5, the annulus 124' of the load piston 118 does not define an orifice. In this embodiment, the pressure of the fluid in the clutches upstream of the orifice 26 is reduced to the same level as the pressure in the clutches downstream of the orifice 26. This is evident since the size of the annulus does not provide any restriction to fluid flow therebetween.

The modulating pressure relief valve assembly 28 set forth above provides an arrangement that controls the rate of pressure rise, limits the maximum system pressure, maintains a difference in pressure between two different clutches during initial engagement, and reduces the difference in pressure upon full engagement to improve system efficiency. All of these functions are confined in a single bore, thus keeping the total valve size small and manufacturing costs lower as compared to valves in other systems.

Other aspects, objects and advantages of this invention can be obtained from a study of the drawings, the disclosure and the appended claims.

I claim:

1. A fluid system for use in a vehicle, comprising:
   a source of pressurized fluid;
   a distribution conduit connected to the source;
   means for restricting the flow of fluid in the distribution conduit and establishing a difference in pressure of the fluid in the distribution conduit upstream and downstream of the flow restricting means;
   a first force transmitting mechanism connected to the distribution conduit upstream of the flow restricting means;
   a second force transmitting mechanism connected to the distribution conduit downstream of the flow restricting means; and
   means for selectively interconnecting the distribution conduit upstream and downstream of the flow restricting means in response to the pressure level of the fluid in the distribution conduit reaching a predetermined pressure level.

2. The fluid system, as set forth in claim 1, wherein said interconnecting means includes a housing defining a bore and having a first shunt port intersecting the bore and being connected to the distribution conduit upstream of the flow restricting means and a second shunt port intersecting the bore and being connected to the distribution conduit downstream of the flow restricting means, a valve mechanism slidably disposed in the bore and movable between a first position at which communication between the first and second shunt ports is open and a second position at which said communication is blocked.

3. The fluid system, as set forth in claim 2, wherein said valve mechanism defines an annulus that interconnects the first and second shunt ports when the valve mechanism is in the first position.

4. The fluid system, as set forth in claim 3, wherein the annulus defines an orifice having a flow capacity greater than that of the flow restricting means to restrictively interconnect the first and second shunt ports so that the pressure in the distribution conduit upstream of the flow restricting means is reduced relative to the pressure of the fluid downstream of the flow restricting means.

5. The fluid system, as set forth in claim 3, wherein the annulus defines an opening that freely interconnects the first and second shunt ports so that the pressure of the fluid upstream of the flow restricting means equals the pressure of the fluid downstream of the flow restricting means.

6. The fluid system, as set forth in claim 3, wherein said valve mechanism is biased towards the second position by a spring assembly and biased towards the first position in response to the pressure of the fluid in the distribution conduit.

7. The fluid s ssystem, as set forth in claim 6, including modulating pressure relief valve connected to the distribution conduit downstream of the flow restricting means.

8. The fluid system, as set forth in claim 7, wherein the modulating pressure relief valve is located in the bore of the housing with the valve mechanism of the interconnecting means, and includes an inlet port intersecting the bore and connected to the distribution conduit downstream of the flow restricting means, an outlet port intersecting the bore adjacent the inlet port and connected to a low pressure zone, and a valve spool slidably disposed in the bore and movable between a first position at which communication between the inlet port and the outlet port is blocked and a second position at which said communication is open.

9. The fluid system, as set forth in claim 8, wherein the modulating pressure relief valve has means for providing a variable biasing force to bias the valve spool towards the first position, said variable biasing means includes the valve mechanism, the spring assembly, a pressure chamber defined in the bore between the valve spool and the valve mechanism, and means for controllably interconnecting the pressure chamber and the distribution conduit downstream of the flow restricting means.

10. The fluid system, as set forth in claim 9, wherein the valve mechanism is a load piston adapted to operatively cooperate with the valve spool to establish a predetermined rate of pressure rise in the distribution conduit and to interconnect the first and second shunt ports in response to the pressure of the fluid in the distribution conduit downstream of the flow restricting means reaching the prdetermined pressure level.

11. The fluid system, as set forth in claim 10, wherein the flow restricting means is an orifice located in the distribution line.

12. The fluid system, as set forth in claim 7, wherein said low pressure zone is a torque converter.

13. The fluid system, as set forth in claim 12, wherein the first force transmitting mechanism includes a speed selector valve and first and second speed clutches, and the second force transmitting mechanism includes a directional selector valve, a forward clutch, and a reverse clutch.

14. The fluid system, as set forth in claim 13, including a conduit connecting the outlet port with a reservoir and having the torque converter located therein, said housing including a vent port intersecting the bore and connected to the conduit between the outlet port and the torque converter, and a drain port intersecting the bore and connected to the reservoir so that the fluid to the torque converter can be controllably communicated with the reservoir.

15. The fluid system, as set forth in claim 14, wherein the vent port is open to the drain port during movement of the valve mechanism between the second position and an intermediate position and is blocked from the drain port during movement from the intermediate position to the first position so that the fluid to the torque converter is vented to the reservoir during a portion of the time that the pressure of the fluid in the distribution conduit is increasing.

16. A modulating pressure relief valve assembly adapted for use in a fluid system having a source of pressurized fluid and a flow restricting means located in a distribution conduit connected to the source, the flow restricting means being adapted to establish a difference in pressure of the fluid upstream and downstream of the flow restricting means, comprising:
   a modulating pressure relief valve adapted for connection with the distribution conduit downstream of the flow restricting means; and
   means for selectively interconnecting the distribution conduit upstream of the flow restricting means with the distribution conduit downstream of the flow restricting mans in response to the pressure of the fluid in the modulating pressure relief valve reaching a predetermined pressure level so that the difference in pressure between the upstream side of the flow restricting means and the downstream side is reduced.

17. The modulating pressure relief valve assembly, as set forth in claim 16, wherein the selectively interconnecting means includes a housing having a bore, first and second shunt ports each intersecting the bore and respectively adapted to connect with the distribution conduit upstream and downstream of the flow restricting means, and a valve mechanism slidably disposed in the bore and movable between a first position at which communication between the first and second shunt ports is open and a second position at which said communication is blocked.

18. The modulating pressure relief valve assembly, as set forth in claim 17, wherein said valve mechanism defines an annulus that interconnects the first and second shunt ports when the valve mechanism is in the first position.

19. The modulating pressure relief valve assembly, as set forth in claim 18, wherein the annulus defines an orifice having a size greater than the size of the flow restricting means to restrictively interconnect the first and second shunt ports.

20. The modulating pressure relief valve assembly, as set forth in claim 18, wherein the annulus defines an opening that freely interconnects the first and second shunt ports.

21. The modulating pressure relief valve assembly, as set forth in claim 18, wherein the modulating pressure relief valve is located in the bore of the housing and includes the valve mechanism, a valve spool, a pressure chamber defined in the bore between the valve spool and the valve mechanism, and a spring assembly located in the bore on the opposite side of the valve mechanism from the pressure chamber.

22. The modulating pressure relief valve assembly, as set forth in claim 21, wherein the housing includes an inlet port adapted for connection with the distribution conduit downstream of the flow restricting means, an outlet port adapted for connection with a low pressure zone, said valve spool is movable between a first position at which communication between the inlet and outlet ports is blocked and a second position at which said communication is open.

23. The modulating pressure relief valve assembly, as set forth in claim 22, wherein said modulating pressure relief valve includes means for controllably interconnecting the inlet port with the pressure chamber.

24. The modulating pressure relief valve assembly, as set forth in claim 23, wherein said modulating pressure relief valve includes means for providing a variable force to bias the valve spool to the first position, said valve spool being biased toward the second position in response to the fluid pressure at the inlet port.

25. The modulating pressure relief valve assembly, as set forth in claim 24, wherein the variable biasing means includes the pressure chamber, the valve mechanism and the spring assembly.

26. The modulating pressure relief valve assembly, as set forth in claim 23, wherein the controllably interconnecting means includes a second inlet port in the housing intersecting the bore and adapted to connect with the distribution conduit downstream of the flow restricting means and means for orificing the flow of fluid between the second inlet port and the pressure chamber, said orificing means being located in the valve spool.

27. The modulating pressure relief valve assembly, as set forth in claim 26, wherein the pressure chamber is a first pressure chamber and the orificing means includes a blind bore defined in one end of the valve spool and opening into said first pressure chamber, a valving element slidably disposed in the blind bore and retained therein by a flat washer secured to the open end of the blind bore, a spring located between the valving element and the flat washer, a second pressure chamber defined in the blind bore between the closed end of the blind bore and the valving element and being in continuous communication with the second inlet port, and an orifice located in the valving element adapted to interconnect the first and second pressure chambers.

28. The modulating pressure relief valve assembly, as set forth in claim 27, wherein the housing includes a second drain port intersecting the bore of the housing and being connected with the blind bore in the valve spool through a passage in the valve spool, said valving element being movable to a first position at which said first pressure chamber is blocked from the second drain port and to a second position at which said first pressure chamber is open to the second drain port.

29. The modulating pressure relief valve assembly, as set forth in claim 28, wherein said valving element is movable to the first position in response to the pressure of the fluid at the second inlet port and movable to the second position by the biasing force of a spring and the pressure of the fluid in the first pressure chamber.

* * * * *

UNITED STATES PATENT AND TRADEMARK OFFICE
CERTIFICATE OF CORRECTION

PATENT NO. : 4,583,624

DATED : April 22, 1986

INVENTOR(S) : William W. Blake

It is certified that error appears in the above–identified patent and that said Letters Patent are hereby corrected as shown below:

Column 7, line 59, delete "s ssystem" and insert --system--.

Column 8, line 28, delete "7" and insert --8--.
         line 36, delete "13" and insert --12--.

Signed and Sealed this

Nineteenth Day of August 1986

[SEAL]

Attest:

DONALD J. QUIGG

Attesting Officer     Commissioner of Patents and Trademarks